United States Patent
Whiteside et al.

(10) Patent No.: US 7,464,564 B2
(45) Date of Patent: Dec. 16, 2008

(54) METHOD AND APPARATUS FOR COMBINING COOKIE DOUGH AND ICE CREAM

(75) Inventors: Adam Whiteside, Paducah, KY (US); Geoffrey Hannan, Grand Chain, IL (US); Glen Thompson, Metropolis, IL (US); John Lipert, Metropolis, IL (US); Tiffany Reagor, Karnak, IL (US); Jamie Ehling, Kevil, KY (US); Dana Knudsen, Paducah, KY (US)

(73) Assignee: Dippin' Dots, Inc., Paducah, KY (US)

( * ) Notice: Subject to any disclaimer, the term of this patent is extended or adjusted under 35 U.S.C. 154(b) by 799 days.

(21) Appl. No.: 10/947,030

(22) Filed: Sep. 22, 2004

(65) Prior Publication Data
US 2005/0064074 A1    Mar. 24, 2005

Related U.S. Application Data

(60) Provisional application No. 60/504,832, filed on Sep. 22, 2003.

(51) Int. Cl.
   *A23G 9/00* (2006.01)
(52) U.S. Cl. .......................................... 62/342; 99/455
(58) Field of Classification Search .............. 62/60, 62/342, 343; 99/452, 455
   See application file for complete search history.

(56) References Cited

U.S. PATENT DOCUMENTS

| | | | |
|---|---|---|---|
| 1,467,615 A | 9/1923 | Fairbanks | |
| 1,538,730 A | 5/1925 | Obersohn et al. | |
| 1,612,167 A | 12/1926 | Beardsley et al. | |
| 2,059,733 A | 11/1936 | Heisser | |
| 2,263,259 A | 11/1941 | Boosey | |
| 2,448,802 A | 9/1948 | Holzcker | |
| 2,507,873 A | 5/1950 | Ward | |
| 2,541,984 A | 2/1951 | Chandley | |
| 2,545,140 A | 3/1951 | Escher | |
| 2,708,055 A | 5/1955 | Alexander | |
| 2,715,484 A | 8/1955 | Alexander | |
| 2,875,588 A | 3/1959 | Berger | |
| 2,893,605 A | 7/1959 | Anderson | |
| 3,023,171 A | 2/1962 | Smith | |
| 3,057,522 A | 10/1962 | Reed | |
| 3,060,510 A | 10/1962 | Fischer et al. | |
| 3,089,316 A | 5/1963 | Robbins | |
| 3,097,501 A | 7/1963 | Pappas | |
| 3,162,019 A | 12/1964 | Porter et al. | |
| 3,228,838 A | 1/1966 | Rinfret et al. | |
| 3,291,076 A | 12/1966 | Flanigan et al. | |
| 3,320,694 A | 5/1967 | Biron | |
| 3,344,617 A | 10/1967 | Rinfret et al. | |
| 3,360,384 A | 12/1967 | Kurzinski et al. | |
| 3,647,478 A | 3/1972 | Minor et al. | |

(Continued)

FOREIGN PATENT DOCUMENTS

CA    964921    3/1975

*Primary Examiner*—William E Tapolcai
(74) *Attorney, Agent, or Firm*—Stockwell & Smedley, PSC

(57) ABSTRACT

A method and apparatus for combining beaded ice cream and cookie dough is disclosed. The ice cream is dripped, beaded, frozen, and then combined with precut shapes of cookie dough. The resulting combination is packaged for subsequent storage at low temperature.

6 Claims, 1 Drawing Sheet

U.S. PATENT DOCUMENTS

| | | | | |
|---|---|---|---|---|
| 3,756,372 | A | 9/1973 | Mertens | |
| 3,832,764 | A | 9/1974 | Fletcher et al. | |
| 3,857,974 | A | 12/1974 | Aref et al. | |
| 3,889,701 | A | 6/1975 | Mueller | |
| 3,896,923 | A | 7/1975 | Griffith | |
| 3,955,596 | A | 5/1976 | Diaz | |
| 4,009,740 | A | 3/1977 | Michielli | |
| 4,031,262 | A | 6/1977 | Nakayama et al. | |
| 4,077,227 | A * | 3/1978 | Larson | 62/74 |
| 4,109,966 | A | 8/1978 | Boyhont et al. | |
| 4,114,427 | A | 9/1978 | Iguchi et al. | |
| 4,159,721 | A | 7/1979 | Horter | |
| 4,218,786 | A | 8/1980 | Taglarino | |
| 4,220,242 | A | 9/1980 | Forsberg | |
| 4,228,802 | A | 10/1980 | Trott | |
| 4,235,187 | A | 11/1980 | Mirza | |
| 4,251,547 | A | 2/1981 | Liggett | |
| 4,310,559 | A | 1/1982 | Mita et al. | |
| 4,344,361 | A | 8/1982 | MacPhee et al. | |
| 4,353,927 | A | 10/1982 | Lovercheck | |
| 4,380,284 | A | 4/1983 | Ito et al. | |
| 4,401,402 | A | 8/1983 | Casperson | |
| 4,655,047 | A * | 4/1987 | Temple et al. | 62/64 |
| 4,687,672 | A | 8/1987 | Vitkovsky | |
| 5,126,156 | A | 6/1992 | Jones | |
| 5,219,455 | A | 6/1993 | Trucco | |
| 5,232,027 | A | 8/1993 | Tanaka et al. | |
| 5,307,640 | A | 5/1994 | Fawzy et al. | |
| 5,378,483 | A | 1/1995 | Fazio et al. | |
| 5,403,611 | A | 4/1995 | Tomita et al. | |
| 5,464,119 | A | 11/1995 | Giuseppe et al. | |
| 5,620,732 | A | 4/1997 | Clemmings et al. | |
| 5,958,493 | A | 9/1999 | Grigoli | |
| 6,000,229 | A | 12/1999 | Jones et al. | |
| 6,060,099 | A * | 5/2000 | Ito | 426/243 |
| 6,089,747 | A | 7/2000 | Huang | |
| 6,103,287 | A | 8/2000 | Soehnlen et al. | |
| 6,145,701 | A | 11/2000 | Van Der Merwe et al. | |
| 6,209,329 | B1 | 4/2001 | Jones et al. | |
| 6,209,590 | B1 | 4/2001 | Mandsberg | |
| 6,223,542 | B1 | 5/2001 | Jones et al. | |
| 6,250,794 | B1 | 6/2001 | Huang | |
| 6,267,049 | B1 | 7/2001 | Silvano | |
| 6,318,889 | B1 | 11/2001 | Hansen, Sr. | |
| 6,355,290 | B1 * | 3/2002 | Soehnlen et al. | 426/393 |
| 6,494,049 | B1 | 12/2002 | Jones et al. | |
| 6,539,743 | B2 * | 4/2003 | Jones | 62/381 |
| 7,316,122 | B1 * | 1/2008 | Jones et al. | 62/347 |
| 2002/0129616 | A1 | 9/2002 | Jones | |
| 2003/0077364 | A1 | 4/2003 | Feloa | |
| 2003/0216470 | A1 | 11/2003 | Fink | |

* cited by examiner

METHOD AND APPARATUS FOR COMBINING COOKIE DOUGH AND ICE CREAM

CROSS-REFERENCE TO RELATED APPLICATIONS

This application claims priority to U.S. Provisional Patent Application No. 60/504,832, which was filed on Sep. 22, 2003.

FIELD OF THE INVENTION

This invention relates generally to manufacturing a product which combines beaded ice cream and cookie dough.

BACKGROUND OF THE INVENTION

Food products such as ice cream have been marketed in a variety of contexts. Because ice cream is such a lucrative market, manufacturers are always seeking a new market niche. Consequently, an ice cream product which is unique and tastes good while combining popular flavors is desired.

BRIEF SUMMARY OF THE INVENTION

This invention has as its primary objective a method and apparatus for combining beaded ice cream with dough shapes. A further objective of the present invention is to achieve this combination in a variety of percentages of both ingredients, and to do so in a way that can be reliably and accurately reproduced.

These and other objects and advantages of the invention will become readily apparent as the following description is read in conjunction with the accompanying drawings and claims.

DETAILED DESCRIPTION OF THE PREFERRED EMBODIMENTS

Figure 1:
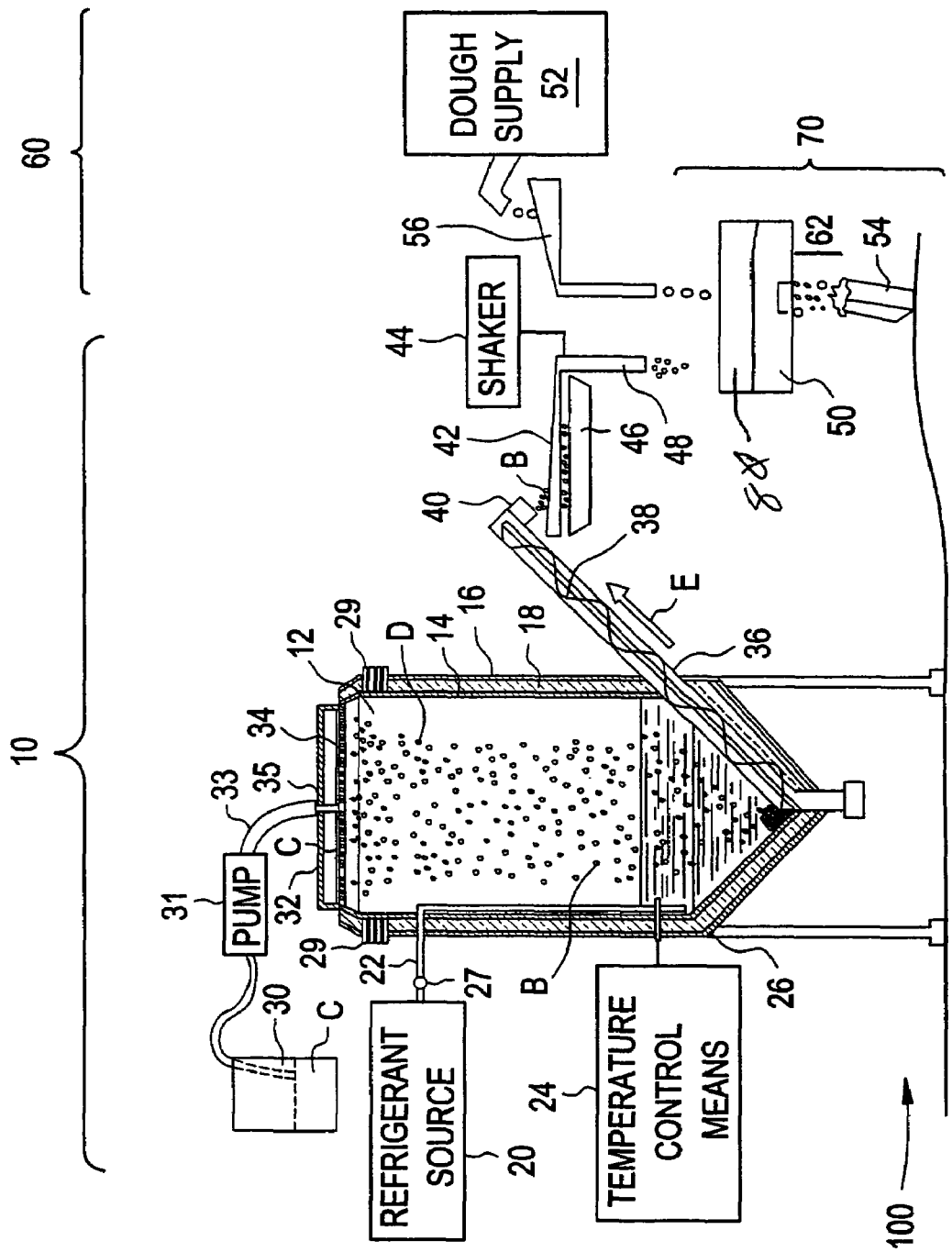
FIG. 1 shows a plan view of the present invention.

FIG. 1 shows an apparatus 100 that may be utilized to produce free-flowing, frozen alimentary dairy products in accordance with the method of the present invention. It should be recognized that this apparatus 100 is merely being described as an example of one type of apparatus designed for this purpose. Other designs may, of course, be utilized in accordance with the present method to produce the free-flowing, frozen alimentary dairy product.

As shown in FIG. 1, the apparatus 100 includes a beading mechanism 10 and a dough mechanism 60, both of which output food products to a bagging mechanism 70. Specifically, the beading mechanism produces beads B, while the dough mechanism contains shapes S that may have been produced elsewhere. The beads B and shapes S are combined and bagged by the bagging mechanism 70.

The beading mechanism 10 includes a freezing chamber 12 having an inner wall 14 and outer wall 16. Preferably, both the walls are constructed of stainless steel to provide both strength and corrosion resistance. A thick layer of thermal insulating material 18 is provided between the walls to improve the efficiency of the freezing chamber by reducing the thermal transfer through the walls 14, 16 between the interior of the chamber 12 and the ambient environment.

The chamber 12 is chilled by the direct addition of refrigerant from a refrigerant source 20 through the delivery line 22. A number of different refrigerants can be utilized although liquid nitrogen is preferred. This material is readily available, relatively inexpensive and relatively inert to food products. It is also sufficiently cold to provide for relatively rapid freezing of the product. As such, it is particularly adapted for utilization in the processing of free-flowing, alimentary dairy products in accordance with the present invention.

The temperature of the freezing chamber as well as the level of liquid refrigerant is maintained within a specified range through the utilization of a temperature control means 24 such as a thermostat. More specifically, the temperature control means 24 may be connected to a thermocouple 26. The thermocouple 26 is positioned to extend into the freezing chamber 12 at a selected height between, for example, 4 to 18 inches above the bottom of the chamber to sense the temperature within the chamber. Where, for example, liquid nitrogen (LN2) is utilized as the refrigerant, the thermostat is set to maintain the temperature within the chamber 12 at the thermocouple 26 between approximately −300 to −320 degrees F. The positioning of the thermocouple 26 some 4 to 18 inches above the bottom of the chamber 12 provides the necessary reservoir of refrigerant to quick freeze the droplets of the alimentary composition. The ultra-low temperature of the refrigerant limits the formation of ice crystals in the beads B as they are frozen. By reducing the overall size of the ice crystals being formed, the resulting frozen product has a richer, creamier texture and exhibits a better, overall flavor.

When the temperature within the chamber 12 at the thermocouple 26 rises above the set range of operation, a valve 27 is then opened to allow delivery of liquid nitrogen from the source 20 through the line 22 to the chamber 12. Once the liquid refrigerant level within the chamber 12 reaches and contacts the thermocouple 26, the desired level of liquid refrigerant for freezing the composition is restored and the valve 27 is closed.

Vents 29 are provided in the walls 14, 16 near the top of the freezing chamber 12. These vents 29 serve to release rising nitrogen vapor from the chamber 12 and prevent any build-up in pressure in the chamber or any excess lowering of temperature near the top such that the dropper system is frozen over time. This exhaust can be controlled manually by venting through an exit pipe which is controlled by a damper. Alternatively, the exhaust gas can be collected under vacuum by the use of an exhaust fan. This cold vapor can be routed to other parts of the process where cold vapors can be utilized such as in storage spaces or with packaging machines.

Typically, the composition of beads B will be dairy based and includes such ingredients as cream, milk, butter and/or eggs. However, other ingredients could also be used, thus the present invention should not be considered as limited exclusively thereto.

After preparing the composition comes the step of slowly dripping the composition into the freezing chamber 12. This may be accomplished in a number of ways. For example, as shown in FIG. 1, the composition C may be pumped from a supply container 30 into a dropper system including a tray 32 positioned across the upper end of the freezing chamber 12. More specifically, the composition is pumped by pump 31 through the tube 33 so as to be delivered through an inlet 35 in the top of the tray that closes the tray to prevent any residual dirt or dust in the air from falling into the composition. The bottom of the tray 32 includes a series of apertures 34 through which the composition drips into the freezing chamber 12. Preferably, the apertures have a diameter of between substantially 0.125 and 0.3125 inches so as to provide the desired size droplets of composition for freezing into beads. Of course, the size of the droplets and rate of flow will be determined not only by the size of the holes, but the thickness of the composition and in some cases the thickness of the tray.

As the droplets D of composition fall downwardly in the freezing chamber, they contact cold nitrogen gas rapidly vaporizing from the pool of liquid nitrogen P at the bottom of the chamber. As a result of the temperature within the range of −260 to −320 degrees F. (typical for LN2), rapid freezing of the droplets of composition occurs. The small beads B that are produced contain only relatively small ice crystals, thereby preserving their flavor properties. The beads B have a smooth, spherical appearance.

An auger 36 for collecting the beads extends into the bottom of the chamber 12. As shown, the auger is positioned at an angle of approximately 45 degrees with respect to the horizontal. Preferably, the auger 36 includes flights having a diameter of substantially 1.5" to 3.5".

As the auger 36 is rotated, the beads B are drawn upwardly in the direction of action arrow E on the flights 38. Liquid refrigerant is, however, not withdrawn from the freezing chamber as sufficient space exists between the flights 38 and the walls of the auger 36 so as to allow the liquid nitrogen to drain back to the pool P. This space is, of course, not large enough to allow the passage of the beads B.

Once the beads B reach the top of the auger 36, they can deposited by means of a chute 40 onto a sieve 42. The sieve 42 is connected to a shaking apparatus 44 which serves to vibrate the beads B on the sieve 42. Thus, sifting of the beads B occurs with the relatively large beads having a diameter of, for example, approximately 2 mm or larger remaining on the surface of the sieve while the smaller beads and fragmented portions of broken beads fall through the sieve into the collecting pan 46. That material collected in the pan 46 can be melted and reprocessed by mixing back in with the composition C that is added to the tray 32 as described above. The sieve 42 and shaking apparatus 44 are suggested possibilities, but the present invention can be implemented without them, and thus should not be considered as limited exclusively thereto.

In any case, the larger beads flow over the sieve to a discharge chute 48 where they are deposited into a volumetric bagger 50, to be combined with shapes S in a process that will now be explained.

The dough supply 52 contains cookie dough pre-cut into predetermined shapes S, and maintains those shapes S at a temperature not to exceed 0 degrees F. One example of a shape S can be a cube, although the present invention should not be considered as limited thereto. Other shapes including triangles or hearts could be used, according to some type of promotion or as required by a customer. Regardless of the specific shape, the cookie dough shapes S can be lightly dusted to have a light tan coloring, yet limited so as to conceal the appearance of the dough cubes. In this way, appropriate color blending between the shapes S and the sometimes colorful beads B can be achieved. Again, the light tan color, or the concept of dusting the shapes S, are both for exemplary purposes only and the present invention should not be considered as limited thereto.

Alternatively, a shelf-stable set of shapes S which do not require refrigeration is also contemplated within the spirit and scope of the present invention. One way to achieve room-temperature stability is to eliminate certain ingredients which make the shapes require refrigeration, such as perishable oils. Another way is to eliminate ingredients that include chocolate chips, because the chocolate chips contain butter and cream, both of which could contain perishable oils or other substances requiring refrigeration.

In the event cookie dough is chosen for the shapes S, the cookie dough can comprise the following: unenriched wheat flour, sugar, and some type of margarine. The margarine referred to herein can comprise liquid soybean oil, partially hydrogenated soybean oil, water, salt, whey, vegetable monoglycerides, vegetable diglycerides, soy lecithin, sodium benzoate, beta carotene, and vitamin A palmitate. In the event chocolate chips are chosen for inclusion within the shapes S, the chocolate chips can comprise sugar, chocolate liquor, cocoa butter, soy lecithin, and vanilla.

It is important to note that the cookie dough ingredients sometimes do not include egg-based materials, because egg products must be baked prior to refrigeration in order to prevent salmonella. To address this, the dough ingredients can be baked prior to combining the beads B. Another advantage is that after baking, it may not be necessary to refrigerate some egg-based dough products. Accordingly, the dough shapes S could also be baked, or baked and then refrigerated, prior to being integrated with the beads B.

Regardless of whether baking or refrigeration is required, the ingredients for the dough shapes S can consist of various combinations of the following: praline pecans, crème brulee bark, coffee cake pieces, chocolate flakes, phyllo dough pieces, cinnamon streusel pieces, cinnamon pie crust, shortcake pieces, white cake pieces, raspberry flakes, chocolate cake pieces, pound cake pieces, doughnut pieces, neuces pieces, lemon bark, raspberry sprinkles, key lime bark, graham crunch, spice cake pieces, bubble gum pop rocks, watermelon seeds, cotton candy pieces, caramel apple flakes, sour apple sprinkles, filled chocolates, oat crisp, wheat germ, and mocha sprinkles. The dough shapes S can also comprise peanut butter dough, shortbread batter, and brownie batter.

In the cubical embodiment, the shapes S are formed to measure 5/16"×5/16"×5/16", so as to achieve an appropriate ratio between the shapes S and beads B. These shapes also can have specific gravity at 20 C. of 1.25 +/−0.05, although other ranges are possible. These size and specific gravity features are not rigid, but were found efficacious in preventing the shapes S, being heavier and larger than beads B, from settling to the bottom of the container 54. However, any size, density, and specific gravity which achieves this purpose is acceptable.

As shown in FIG. 1, a blending apparatus 80 can combine the beads S and shapes S in any of a variety of ratios. One exemplary ratio is 19 oz shapes per every gallon of combination 62, although the present invention should not be considered as limited thereto. The blending apparatus outputs the combination 62 to the volumetric bagger 50 which deposits the combination 62 into the container 54. The container 54 could be a bag, box, or some other food storage device. The container 54 is maintained open for substantially 1-10 minutes in order to allow any residual nitrogen refrigerant retained in or on the surface of the beads to vaporize. The container 54 can also be composed of a gas-permeable membrane which does not trap but instead allows for escaping of additional nitrogen. After the above-referenced delay, the container 54 is sealed and placed in a freezer for storage.

In order to prevent the combination 62 from sticking together during storage and thereby maintain its free-flowing character, they must be maintained at a relatively low temperature. More specifically, if the combination 62 is to be stored for greater than a period of approximately 30 hours, they should be stored in the refrigerator at a temperature of at least as low as −20 degrees F. More preferably, the beads are stored at a temperature between −30 and 40 degrees F.

Alternatively, if the combination 62 is to be consumed within a 30-hour period (or shorter period of 10-12 hours for certain compositions), they are to be stored in the freezer at a temperature of −20 degrees F. or above. More preferably, the beads are brought to a temperature between substantially −10 and −20 degrees F., with −15 degrees F. providing the best results. Warmer temperatures may result in the beads sticking together and the product losing its unique free-flowing property which adds to its consumer appeal.

It is anticipated that various changes may be made in the arrangement and operation of the system of the present invention without departing from the spirit and scope of the invention, as defined by the following claims.

What is claimed is:

1. An apparatus for combining beaded ice cream and cookie dough, comprising:
   a bead mechanism, for cryogenically manufacturing beads of ice cream;
   a dough mechanism, for storing shapes of dough that are to be combined with said beads;
   a volumetric bagger, for measuring and then storing a combination of said beads and said dough; and
   a container, for receiving the output of said volumetric bagger wherein said container is composed of a gas-permeable membrane.

2. The apparatus of claim 1, further comprising:
   a blending apparatus, for ensuring that said beads and dough are stored in amounts in accord with a pre-determined proportion.

3. The apparatus of claim 1, wherein said bead mechanism further comprises:
   a freezing chamber, containing LN2
   a drip mechanism; and
   an auger for transporting said frozen beads upwards from the bottom of the freezing chamber.

4. The apparatus of claim 3, wherein said drip mechanism is a tray with apertures of a predetermined size, chosen according to the composition of the ice cream mix being dripped therethrough.

5. The apparatus of claim 1, wherein said beads are dairy based and comprise at least one of cream, milk, butter, and eggs.

6. The apparatus of claim 1, wherein said shapes are at least one of cubes, triangles, and hearts.

* * * * *